United States Patent [19]

Barke et al.

[11] 4,082,128

[45] Apr. 4, 1978

[54] PLANING AND DISINTEGRATING APPARATUS

[76] Inventors: Heinrich Barke; Gisela Barke, both of Felsenbachstr. 20, Siegen-32-Niederschelden, Germany, 5900

[21] Appl. No.: 782,758

[22] Filed: Mar. 30, 1977

[51] Int. Cl.$^2$ .......................... B27G 13/04; B23C 5/20

[52] U.S. Cl. .................................... 144/230; 144/240; 407/47

[58] Field of Search ............... 144/230, 229, 218, 240; 29/105 R; 241/282.2

[56] References Cited

U.S. PATENT DOCUMENTS 2,598,933 6/1952 Nevin .................................. 144/230

3,989,077 11/1976 Humbert .............................. 144/230

*Primary Examiner*—Donald R. Schran

*Attorney, Agent, or Firm*—Kurt Kelman

[57] ABSTRACT

A planing apparatus comprises a knife replaceably mounted in a carrier and having two parallel major faces and two parallel minor faces inclined with respect to the major faces whereby the cross section of the knife forms a parallelogram, each of the minor faces forming a knife edge at their intersection with the major faces. A knife support supports the knife in the carrier and includes a first transverse ledge holding the knife in place and a second transverse ledge spaced from the knife. The second ledge has a thickness in slight excess of the thickness of the knife.

6 Claims, 8 Drawing Figures

PLANING AND DISINTEGRATING APPARATUS

The present invention relates to an apparatus for planing and disintegrating wood, synthetic resin and other materials, wherein a planing knife with a smooth or serrated knife edge is replaceably mounted in a carrier.

Wood, synthetic resin and other materials are planed and disintegrated with planing knives whose knife edges must be sharpened after they have become dull. Also known are disposable planing knives which are thrown away after their edges are worn, the replacement of such knives being possibly less expensive than the sharpening of knife edges. Furthermore, a large portion of the knives whose edges are resharpened is used up in clamping the knife in the carrier and is not usable as a knife. Depending on the type of apparatus, up to about two thirds of the entire width of the knife may be used for clamping. Since the knives are made of expensive steel and are used in planing apparatus in large numbers, this practice is exceedingly expensive.

It is a primary object of this invention to provide a universally useful apparatus wherein readily manufactured knives for paring, planing and disintegrating may be replaceably used, whether with smooth or serrated knife edges, without the need for re-sharpening the edges, and which may be supported by worn-out knives used as knife supports.

The above and other objects are accomplished in accordance with the invention with an apparatus comprising a carrier, a knife replaceably mounted on the carrier and a knife support supporting the knife in the carrier. The knife has two parallel major faces defining the thickness of the knife and two parallel minor faces inclined with respect to the major faces whereby the cross section of the knife taken perpendicularly to the major faces forms a parallelogram, each of the minor faces forming a knife edge at their intersection with the major faces. The knife support includes a first transverse ledge affixed to the support and holding the knife in place with respect to the support, and a second transverse ledge affixed to the support and spaced from the knife, the second ledge having a thickness in slight excess of the thickness of the knife.

Figure 1:
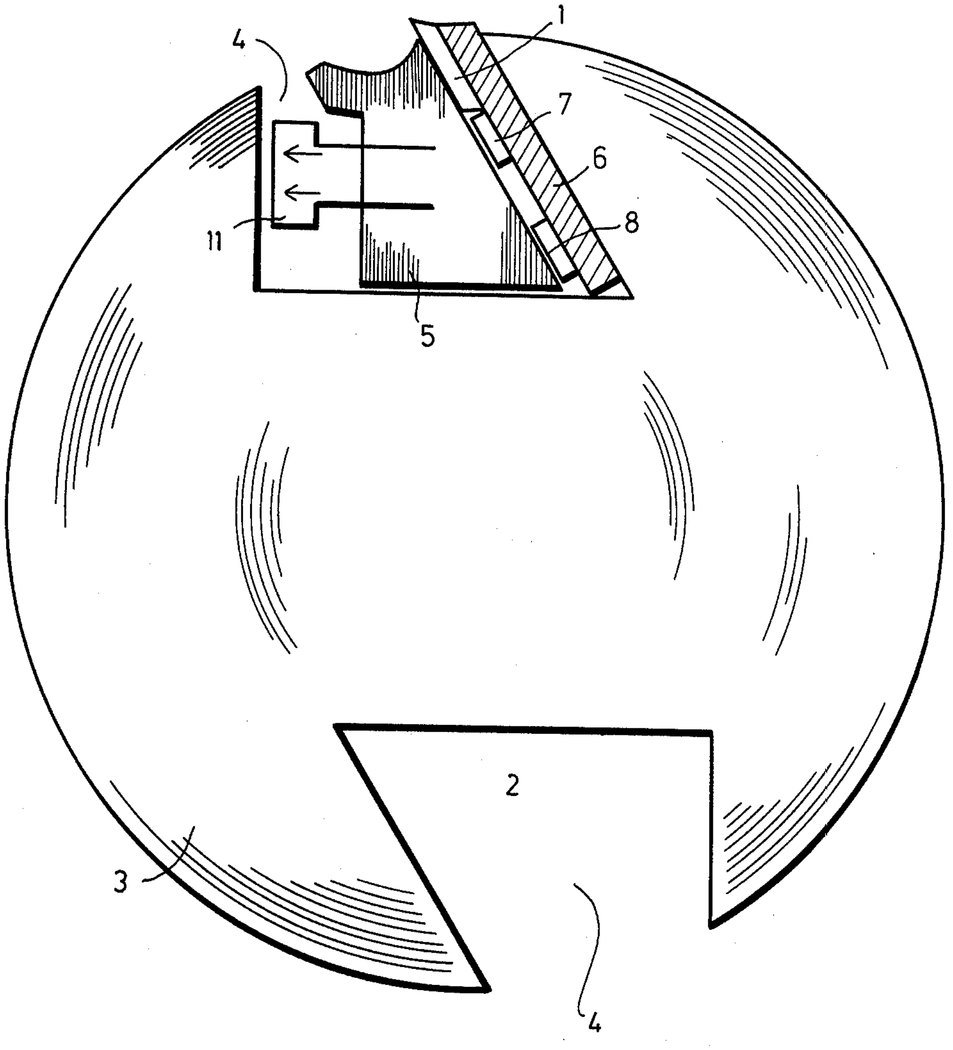
Figure 2:
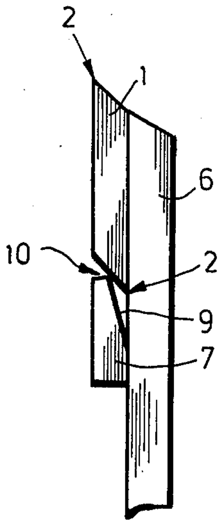
Figure 3:
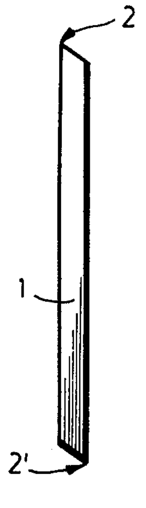
Figure 4:
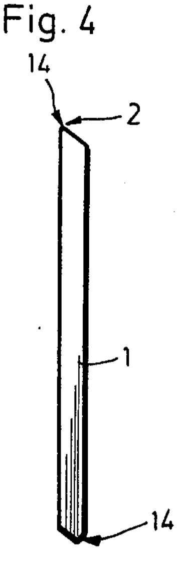
Figure 8:
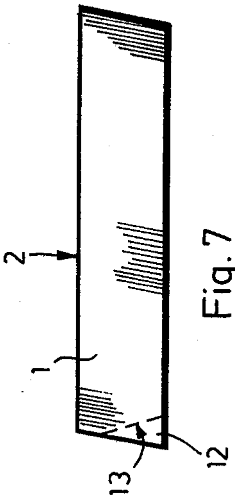
Figure 7:
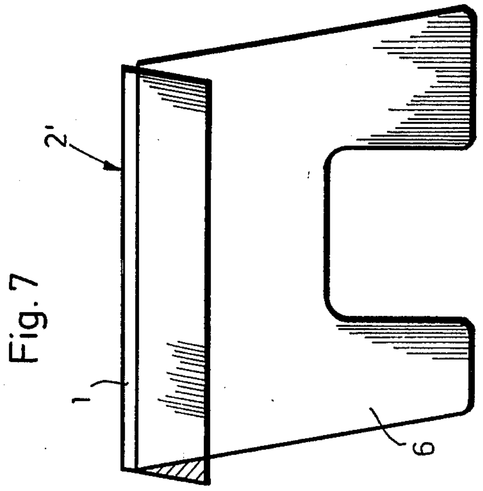
Figure 6:
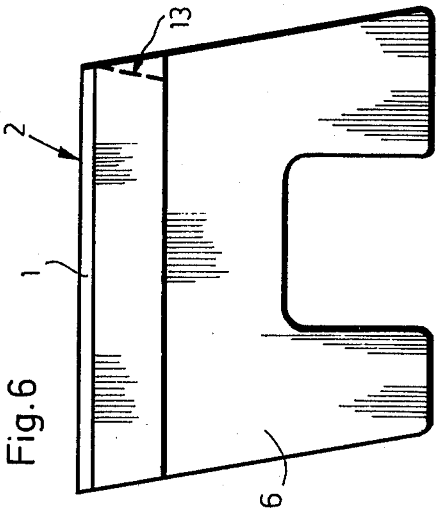
Figure 5:
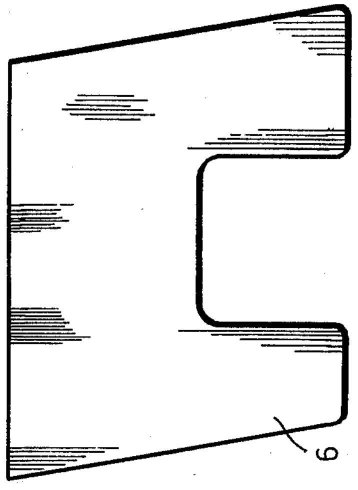

The objects, advantages and features of the present invention will become more apparent from the detailed description of certain preferred embodiments thereof, taken in conjunction with the accompanying drawing wherein FIG. 1 is an end view, partly in cross section, of a cutter arbor for a planing machine, a milling head and the like, FIG. 2 is an enlarged end view of the knife arrangement, FIG. 3 is an end view of one embodiment of a planing knife according to this invention, FIG. 4 is a like view of a modified embodiment, FIG. 5 is a plan view of a conventional planing knife with oblique side edges, FIG. 6 is a plan view showing the knife of FIG. 5 used as a support for the knife of FIG. 3, FIG. 7 shows the same view of FIG. 6 but with the knife turned around to present its other cutting edge, and FIG. 8 is a plan view of the knife of FIG. 7.

Referring now to the drawing and first to FIG. 1, the illustrated carrier for knife 1 is cutter arbor 3 which is rotatably mounted in the frame of a planing machine (not shown). The cutter arbor has diametrically opposed recesses 4 wherein the planing knife is clamped in a conventional manner, the clamping means including knife support 6 and clamping plate 5 wherebetween knife 1 is replaceably mounted, the clamping plate being movable into clamping engagement with the knife by set screws 11. Since the knife clamping is entirely conventional and forms no part of the invention, it has been illustrated only diagrammatically.

As is more clearly shown in FIGS. 3 and 4, knife 1 has two parallel major faces defining the thickness of the knife and two parallel minor faces inclined with respect to the major faces whereby the cross section of the knife taken perpendicularly to the major face forms a parallelogram. Each minor face forms a knife edge 2, 2′ (FIG. 3) at its intersection with a respective one of the major faces.

In the modification of FIG. 4, the minor faces of the knife are formed with small faces 14 enclosing an angle with the major portion of the minor faces in the region of cutting edges 2, 2′.

Knives 1 of this invention are preferably made of steel strip. After cutting edge 2 has been worn out, the knife is turned around to use edge 2′ as the knife edge. After both knife edges are dulled, the knife is replaced. In other words, the knives are disposable.

Knife support 6 is a plate and, advantageously, a conventional worn planing knife may be used as support 6. According to the invention, two transverse ledges 7 and 8 are affixed to support 6, for instance by welding. First ledge 7 serves to hold knife 1 in place with respect to support 6, i.e. to determine how far the knife edge projects from the cutter arbor. In the embodiment of FIG. 2, ledge 7 has a thickness slightly less than that of knife 1 and a face extending obliquely from knife support 6 to define clamping gap 9 therebetween. One of the knife edges extends into gap 9 and the minor face of the knife forming this knife edge is in contact with first ledge 7 along the center line of the minor face, support line 10 for the minor face being thus spaced from the knife edge which extends into gap 9. Second transverse ledge 8 is spaced from the knife and has a thickness in slight excess of the thickness of the knife. This arrangement improves the clamping effect on knife 1 when clamping plate 5 is pressed into engagement with the knife.

When one knife edge has been worn out, the clamping plate is released, the knife is turned around to present the other knife edge thereof at the periphery of the cutter arbor, and the clamping plate is re-tightened, no further radial adjustment of the knife being required since it is held in proper place by ledge 7.

If conventional worn planing knives are used as supports 6, such knives are usually plates which are not rectangular. As illustrated in FIGS. 5 to 7, such support plates have side edges extending obliquely to the end edges. As shown in FIG. 6, when knife 1 is supported on such a plate in one operating position, with its knife edge 2 parallel to one end edge of support 6, the parallelogram form of the knife mates with the form of the support. However, when knife edge 2 is worn and the knife is turned around to present knife edge 2′, an end portion 12 of the knife projects from the support (FIG. 7). To avoid this, one end of knife 1 adjacent the knife edge to be used first is obliquely notched at 13 to enable end portion 12 to be broken off so as to avoid any projecting knife portion.

The apparatus hereinabove disclosed and herein illustrated can be used universally in all types of planing machines in carpenter shops, saw mills, milling heads, disintegration of synthetic resin and wood, and the like. It may be used in existing and conventional machinery, without any changes in the machines. The planing knives used in such machines may then be used, after they have been worn out, as knife supports where their fine material quality is very useful. The knife edge which is not in use is protected in the clamping gap so that it will not be damaged before use and no height adjustment is needed when the knife is clamped to the carrier. We claim:

1. An apparatus for planing and disintegrating wood, synthetic resin and other materials, comprising (a) a carrier, (b) a knife replaceably mounted in the carrier, the knife having (1) two parallel major faces defining the thickness of the knife and (2) two parallel minor faces inclined with respect to the major faces whereby the cross section of the knife taken perpendicularly to the major faces forms a parallelogram, each of the minor faces forming a knife edge at their intersection with the major faces, and (c) a knife support supporting the knife in the carrier, the knife support including (1) a first transverse ledge affixed to the support and holding the knife in place with respect to the support, and (2) a second transverse ledge affixed to the support and spaced from the knife, the second ledge having a thickness in slight excess of the thickness of the knife.

2. The apparatus of claim 1, wherein the knife support is a plate.

3. The apparatus of claim 2, wherein the plate is a worn planing knife.

4. The apparatus of claim 1, wherein the first ledge has a thickness slightly less than that of the knife and a face extending obliquely from the knife support to define a gap therebetween, one of the knife edges extending into the gap and the minor face of the knife forming the one knife edge being in contact with the first ledge along the center line of said minor face.

5. The apparatus of claim 1, wherein the knife support is not rectangular, and one end of the knife adjacent the knife edge to be used first is obliquely notched to enable it to be broken off.

6. The apparatus of claim 1, wherein the knife is a disposable steel strip.

* * * * *

UNITED STATES PATENT OFFICE

CERTIFICATE OF CORRECTION

PATENT NO. : 4,082,128

DATED : Apr. 4, 1978

INVENTOR(S) : Heinrich Barke et al

It is certified that error appears in the above-identified patent and that said Letters Patent are hereby corrected as shown below:

In the title page, between items [22] and [51] insert:--

[30] Foreign Application Priority Data

| | | | |
|---|---|---|---|
| Mar. 30, 1976 | Germany | ........... | 26 13 549 |
| Mar. 3, 1977 | Germany | ........... | 27 09 360 |

Signed and Sealed this

*Twenty-ninth* Day of *January 1980*

[SEAL]

*Attest:*

SIDNEY A. DIAMOND

*Attesting Officer* *Commissioner of Patents and Trademarks*